United States Patent Office 3,185,677

Patented May 25, 1965

3,185,677

SULFONYL AZETIDINONE COMPOUNDS

Horace R. Davis, Roseville, Minn., assignor to Minnesota Mining and Manufacturing Company, St. Paul, Minn., a corporation of Delaware No Drawing. Filed July 8, 1960, Ser. No. 41,500
12 Claims. (Cl. 260—239)

This invention relates to certain novel sulfonyl azetidinones, to novel intermediates in the preparation of these compounds and to processes for preparing them.

The sulfonyl azetidinones of the present invention have not been available heretofore and constitute a novel and valuable class of compounds as do the difunctional sulfonyl isocyanates which are intermediates in the preparation of certain of the sulfonyl azetidinones.

While processes for the preparation of monofunctional sulfonyl isocyanates have been known, they have been subject to certain disadvantages.

So far as is known, no process has been available heretofore for the preparation of difunctional sulfonyl isocyanates.

It is an object of the present invention to provide a novel and useful class of sulfonyl azetidinone compounds which are efficient activators for the polymerization of pyrrolidone-2. It is another object of the present invention to provide an efficient process for their preparation from the corresponding sulfonyl carbamates. It is still another object of the present invention to provide novel difunctional sulfonyl isocyanates which are intermediates in the preparation of the difunctional sulfonyl azetidinones of the invention. It is a further object of the invention to provide an efficient activated polymerization process for the production of pyrrolidone-2. Other objects will become apparent to those skilled in the art from the specification which follows.

In accordance with the present invention it has been found that sulfonyl azetidinones can be obtained easily and in good yield from sulfonyl carbamates represented by the formula:

$$R(SO_2NHCO_2R^a)_m$$

wherein R is a mono- or divalent aliphatic, cyclic or cyclic-aliphatic radical, $R^a$ is an alkyl radical and $m$ is a number corresponding to the valence of R, by first heating the carbamate under dealkoxylating conditions to form the correspondingly substituted sulfonyl isocyanate, and then reacting that compound with an ethylenically unsaturated compound which contains only carbon and hydrogen and recovering the sulfonyl azetidinone product as by crystallization from the reaction mixture or the like.

The ethylenically unsaturated hydrocarbon compound which is reacted with the sulfonyl isocyanate to form the sulfonyl azetidinone may be represented by the formula:

$$\left[R^1-\overset{H}{C}=\overset{R^2}{C}\right]_n R^3$$

wherein $R^2$ is selected from the class consisting of hydrogen and alkyl radicals, $R^1$ is selected from the class consisting of hydrogen, alkyl radicals and radicals joining with $R^3$ to form five or six membered carbocyclic rings, $R^3$ is selected from the class consisting of mono- and divalent hydrocarbon radicals, the carbon-carbon single bond and radicals joining with $R^1$ to form the said carbocyclic ring, and $n$ is one when the $R^1R^3$ carbocyclic ring is formed and conforms to the valence of $R^3$ when the $R^1$—$R^3$ carbocyclic ring is not formed. The five or six membered carbocyclic ring formed by the joining of $R^1$ and $R^3$ includes the two ethylenic carbon atoms shown in the foregoing formula of the ethylenically unsaturated compound and may contain an additional double bond or may be bridged, substituted with other hydrocarbon groups or be fused to other rings.

The reaction according to the invention between the sulfonyl isocyanate and the ethylenically unsaturated compound (olefin) to form the sulfonyl azetidinones of the invention (which may alternatively be named as N-sulfonyl-beta-propiolactams) may be ordinarily represented as follows:

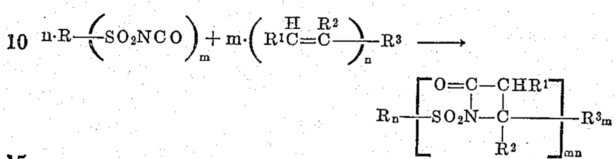

wherein R, $R^1$, $R^2$ and $R^3$, $m$ and $n$ are as previously defined provided that the sum of $m$ and $n$ is not more than 3. When the $R^1R^3$ carbocyclic ring is formed and contains a second double bond (e.g. as in norbornadiene), the foregoing equation holds after a single sulfonyl isocyanate group has reacted across one of the two double bonds but does not hold rigorously after the reaction between the second double bond and a sulfonyl isocyanate group takes place. This second reaction and its product are contemplated herein and are considered to be fully covered.

The addition of the olefin to the sulfonyl azetidinone is generally shown herein as occurring in a given order, i.e. the group designated as $R^2$ is shown as being bonded to the carbon atom which is alpha to the nitrogen atom of the sulfonyl azetidinone. This direction of addition is generally directed by the relative electronegativity of the groups $R^1$, $R^2$ and $R^3$. It is probable, however, that some reverse addition occurs, i.e. so that $R^2$ is bonded to the carbon atom which is beta to the nitrogen, and therefore the invention is not limited, as regards the direction of addition, to the specific structures herein indicated. Rather these structural formulas should be understood as indicating the most probable structure of the majority of the product obtained and corresponding to the empirical formula.

The sulfonylcarbamate starting materials for the process of the invention may be prepared from the correspondingly substituted sulfonyl chlorides. This may be done by adding a solution of the sulfonyl chloride in an inert organic solvent (e.g. benzene, heptane, diethyl ether, tetrahydrofuran, etc.) to a dispersion, in the same solvent, of an alkali-metal derivative of a lower alkyl carbamate to form the alkali-metal sulfonyl lower-alkyl carbamate which precipitates from the reaction mixture as it is formed; stirring the mixture for several hours to drive the reaction to completion; isolating the precipitate and dissolving it in water; acidifying the solution and isolating the sulfonyl lower alkyl carbamate, which separates as a precipitate.

Alternatively the sulfonylcarbamates may be prepared by reacting the corresponding sulfonamide (produced from the sulfonyl chloride by pouring the latter slowly into liquid ammonia, allowing the mixture to warm slowly to ambient temperature and collecting the non-volatile product) with a lower-alkyl halocarbonate (e.g. ethyl chlorocarbonate). The sulfonamide is dissolved in a ketone solvent together wtih an acid accepter (such as potassium carbonate) and a lower-alkyl chlorocarbonate is added dropwise to the solution with agitation. Agitation is continued and the mixture is maintained at reflux until the reaction is essentially complete. The solid material in the reaction mixture is then removed and dissolved in water and an excess of hydrochloric acid is added to precipitate the sulfonylcarbamate (as in the previously described alternate method).

A wide variety of sulfonyl chloride, sulfonamide and sulfonylcarbamate derivatives of organic compounds are known to the art, any of which may serve as starting materials for the process of the invention, provided only that the organic radical attached to the sulfonic moiety (i.e. the radical represented herein as R) is free from interfering radicals. Thus, in general, mono- and difunctional sulfonyl carbamate derivatives of aliphatic and aromatic hydrocarbons, araliphatic compounds, and compounds containing heterocyclic ring systems, including sulfonyl carbamate derivatives of compounds which have alkyl, alkoxy and halo-substituents, etc., form suitable precursors for the present invention. The following list is composed of organic sulfonyl-carbamates which are suitable starting materials for the process of the present invention and it will serve to illustrate the wide variety of starting materials suitable for use in this process. For simplicity, all of these compounds will be listed as derivatives of ethyl carbamate (urethane). It is to be understood, however, that other corresponding alkyl sulfonyl carbamates, preferably the lower alkyl sulfonyl carbamates, are equally suitable and are also contemplated.

*Monofunctional aliphatic sulfonylurethanes.*—Methane-sulfonylurethane; ethane-sulfonylurethane; propane-sulfonylurethane; 1-butane-sulfonylurethane; 1-octane-sulfonylurethane; 2-butane-sulfonylurethane; 2-methyl-1-propane-sulfonylurethane; 2-pentane-sulfonylurethane; 3-pentane-sulfonylurethane; 3-methyl-1-butanesulfonylurethane; 2-methyl-1-butanesulfonylurethane; 1-hexane-sulfonylurethane; 2-hexane-sulfonylurethane; 4-methyl-2-pentane-sulfonylurethane; 2-ethyl-1-butane-sulfonylurethane; 1-heptane-sulfonylurethane; 2-heptane-sulfonylurethane; 4-heptane-sulfonylurethane; 2,4-dimethyl-1-pentane-sulfonylurethane; 2,4-dimethyl-3-pentane-sulfonylurethane; 1-octane-sulfonylurethane; 2-octane-sulfonylurethane.

*Monofunctional cyclic sulfonylurethanes.*—Cyclohexane-sulfonylurethane; cycloheptane-sulfonylurethane; benzene-sulfonylurethane; 4-chlorobenzene-sulfonylurethane; 4-bromobenzene-sulfonylurethane; 4-fluorobenzene-sulfonylurethane; other chloro- and bromobenzene-sulfonylurethanes in which the halogen atom may be in any desired position in which the benzene nucleus; dichloro- and dibromobenzene-sulfonylurethanes in which the halogen atoms may be in any desired position in the benzene nucleus; etc. p-phenylbenzene-sulfonylurethane; m-phenylbenzene-sulfonylurethane; o-phenylbenzenesulfonylurethane; 4-phenoxybenzene-sulfonylurethane; naphthalene-2-sulfonylurethane; 5,6,7,8-tetrahydronaphthalene-2-sulfonylurethane; benzothiazole-2-sulfonylurethane, thiophene-2-sulfonylurethane.

*Monofunctional cyclic-aliphatic sulfonylurethanes.*—Cyclohexylmethane sulfonylurethane; cyclohexylethane sulfonylurethane; etc. 4-methylbenzene sulfonylurethane; 4-ethylbenzene sulfonylurethane; 4-n-propylbenzene sulfonylurethane; 4-isopropylbenzene sulfonylurethane; 4-n-butylbenzene sulfonylurethane; 4-isobutylbenzene sulfonylurethane; p-toluenesulfonylurethane; 4-methoxybenzene sulfonylurethane; 4-methyl-$\alpha$-toluenesulfonylurethane; 4-ethoxybenzene sulfonylurethane; 3-methylbenzene sulfonylurethane; 3,4-dimethoxybenzene sulfonylurethane; 3-methoxybenzene sulfonylurethane; 4-methyl-3-chlorobenzene sulfonylurethane.

*Difunctional aliphatic sulfonylurethanes.*—1,2-ethane-bis(sulfonylurethane); 1,3-propane-bis(sulfonylurethane); 1,4-butane-bis(sulfonylurethane); 1,5-pentane-bis(sulfonylurethane); 1,6-hexane-bis(sulfonylurethane); 1,8-octane-bis(sulfonylurethane); 1,12-dodecane-bis(sulfonylurethane); 1,16-hexadecane-bis(sulfonylurethane).

*Difunctional cyclic sulfonylurethanes.*—1,2-benzene-bis-(sulfonylurethane); 1,3-benzene-bis(sulfonylurethane); 1,4-benzene-bis(sulfonylurethane); 2,4-chlorobenzene-bis(sulfonylurethane); 4,4′-biphenyl-bis(sulfonylurethane); 3,3′-biphenyl-bis(sulfonylurethane); 2,2′-biphenyl-bis(sulfonylurethane); 1,4-naphthalene-bis(sulfonylurethane); 1,5-naphthalene-bis(sulfonylurethane).

*Difunctional cyclic-aliphatic sulfonylurethanes.*—2,4-toluene-bis(sulfonylurethane); $\alpha,\alpha'$-p-xylene-bis(sulfonylurethane).

The first step in the process of the invention may be represented as follows:

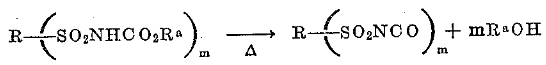

$$R\left(SO_2NHCO_2R^a\right)_m \xrightarrow{\Delta} R\left(SO_2NCO\right)_m + mR^aOH$$

wherein R, $R^a$ and $m$ are as previously defined. The reaction will take place without a de-alkoxylating agent if the precursor is distilled through a suitably heated pyrolysis tube and will also occur without pyrolysis if the precursor is mixed intimately with a solid or liquid de-alkoxylating agent before the reaction is initiated. Glass and acid-resistant alloy reaction vessels, e.g. stainless steel, can be used although some other material, such as quartz, may be preferred in the pyrolysis tube. The sulfonyl isocyanate and the alkyl alcohol are preferably collected separately from the gaseous reaction product mixture by condensation, the separation being more easily accomplished if there is a wide difference between their boiling points. The lower alkyl sulfonylcarbamates are the preferred starting materials, since the resulting lower alkyl alcohols ordinarily boil at substantially lower temperatures than the sulfonyl isocyanates produced. They are also preferred for economic reasons. By the term "lower alkyl" as used herein is meant an alkyl group containing not more than four carbon atoms. Particularly preferred are the sulfonyl ethyl carbamates (i.e. the sulfonylurethanes).

The temperature at which the gaseous products are released from the reaction mixture depends upon the pressure in the reaction vessel, which is preferably initially from about .25 to about 5 millimeters of mercury with a temporary increase therein occurring during the reaction. Although pressures up to about one atmosphere can be used, the most desirable balance of moderate reaction temperature and a moderately rapid removal of the product by distillation can be achieved within the preferred range. At pressures in the preferred range, the reaction starts at about 150° C. and continues on up to about 280° C. when a dealkoxylating agent is used, the higher temperature being necessary to drive the reaction to completion. When no dealkoxylating agent is used, the reaction starts at about 150° C. and may be carried to 650° C. or higher in the pyrolysis zone.

Suitable de-alkoxylating agents for this process include solid materials such as phosphoric anhydride, boric anhydride and p-toluene sulfonic acid, and liquids such as phosphorous oxychloride and thionyl chloride. The ratio of the carbamate to the de-alkoxylating agents (on a weight basis) may vary from 20 to 1 to about 1 to 1. Larger amounts of de-alkoxylating agent may also be used but there is apparently no advantage in doing so. The preferred ratio of carbamate to de-alkoxylating agent is from 2 to 1 to about 4 to 3.

Broadly speaking, the second step in the process of the present invention involves interreacting the sulfonyl isocyanate and the olefin in a closed vessel at a temperature ranging from about 20 to about 170° C. until the addition reaction has occurred and then recovering the desired product. No catalysts, solvents, or other diluents are ordinarily required in the reaction mixture although they may occasionally be desired, e.g. an inert solvent may be charged along with the reactants to liquify or reduce the viscosity of the original charge in order to bring about more intimate initial mixing of the reactants or to allow the product to crystallize from the reaction mixture more easily as the latter is cooled at the end of the reaction. The rates of reaction at temperatures below about 20° C. are ordinarily so slow as to be impractical while if temperatures above about 170° C. are utilized, excessive side reactions and decomposition are often encountered. The preferred reaction temperature, i.e. that which is the most satisfactory both from the point of view of reaction control and of the rate of reaction, is from about 80° C. to about 120° C. The pressure during the reaction need only be sufficiently high to contain the reactants, e.g. low boiling olefins, at the temperatures employed. Although higher pressures are not ordinarily deleterious to the reaction, they are of no particular advantage. The total reaction time is dependent upon the reactants which are charged at the temperature which is maintained during the reaction and is usually from about 5 to about 100 hours. The original reaction mixture is usually a clear liquid which commonly becomes more viscous and assumes an amber or yellowish cast by the end of the reaction time. The sulfonyl azetidinone product either separates by crystallization as the mixture is chilled prior to opening the reaction vessel or can be later separated from the mixture by crystallization from an alcoholic solvent. Water is sometimes also advantageously utilized to assist in the separation.

Among the ethylenically unsaturated, i.e. olefinic, compounds suitable for reaction with the sulfonyl isocyanates to form the sulfonyl azetidinone-2 compounds of the invention are open chain olefins such as isobutylene, butene-1, butene-2, 2-methyl-2-butene, 2-pentene, 2-methyl-1-pentene, 2,4,4-trimethyl-1-pentene, 3-hexene, 2-ethyl-1-hexene, etc.; cyclic olefins such as cyclopentene, cyclohexene, bicyclo (2,2,1-hept-2-ene) (i.e. norbornene) and indene; vinyl aromatic compounds such as styrene, alpha methyl styrene, vinyl toluene, nuclearly substituted styrenes such as p-methylstyrene, and α-vinyl naphthalene; dienes such as butadiene, isoprene, 1-methylbutadiene, 2,3-dimethyl-1,3-butadiene, 2,5-dimethyl-1,5-hexadiene, and divinyl benzene; cyclic dienes such as cyclopentadiene, cyclohexadiene, bicyclo(2,2,1-hepta-2,5-diene); and other similar olefins which contain only carbon and hydrogen.

In addition to the sulfonyl azetidinone compounds, the intermediate difunctional sulfonyl isocyanates which can be produced by the process of the invention also appear to be novel, and are included within the scope of and form a part of the present invention.

The difunctional sulfonyl isocyanates of the invention may be represented by the following formula:

$$R(SO_2NCO)_2$$

wherein R is a divalent radical corresponding to the definition of R as previously set forth. The preferred disulfonyl isocyanate compounds of the invention are those in which R is phenylene or a divalent aliphatic group containing from 2 to 20 carbon atoms. The products are stable to light and to oxygen but must be protected from moisture and may be stored indefinitely at room temperature if so protected. They are sufficiently pure for most uses as collected from the final step of the preparation, although it is possible to purify them further by redistillation.

The monofunctional sulfonyl isocyanates prepared by the process of the invention, on the other hand, include a large number of known compounds. Certain of these are useful intermediates for the preparation of the corresponding sulfonyl ureas which are valuable medicaments distinguished by their strong activity in lowering the sugar content of the blood (e.g. see British Patents 808,071; 808,072; 808,073; 814,234 and U.S. Patent 2,891,960). The sulfonyl isocyanates are reacted with amines to form the sulfonyl ureas of this type, which have the general formula:

$$R—SO_2NHCONHR^b$$

wherein $R^b$ may represent an aliphatic or cycloaliphatic saturated or unsaturated hydrocarbon radical containing two to eight carbon atoms, a saturated or unsaturated open chain or cyclic hydrocarbon radical interrupted by oxygen and/or sulfur etc. and R is a monovalent radical corresponding to the definition of R as previously set forth.

The monofunctional sulfonyl isocyanates have been prepared previously by the reaction of silver cyanate on the corresponding sulfonyl chloride, and by passing phosgene into a solution of the sulfonamide in an inert solvent. Neither of these processes has proved to be generally satisfactory. The former has the disadvantages of expensive intermediates and relatively low conversion rates; while in the latter, if all moisture is not removed from the system before the phosgene treatment, only black tars are obtained as products. Another disadvantage of both of these processes is that it appears to be essentially impossible to recover a pure sulfonyl isocyanate product from either, the major impurity in the products of both processes (both as to amount and difficulty of removal) being the corresponding sulfonyl chloride.

The 1-alkane sulfonyl azetidinone-2 compounds of the invention are ordinarily white crystalline materials at room temperature, although they occasionally have a slight tan or amber color. They have been found to be particularly useful as activators or co-catalysts for the polymerization of pyrrolidone-2. Solid polypyrrolidone of high molecular weight can be produced in this way.

It is known to prepare polymers from pyrrolidone-2 and the procedures described in United States Patents Nos. 2,739,959, 2,809,958 and 2,891,038 all produce polymers described by the generic term polypyrrolidone and having the general unit formula:

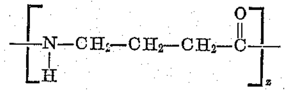

wherein $z$ signifies an indeterminate number of repeating units, the end or terminal groups not beng shown. So far as can be determined the problems arising in handling polypyrrolidone are unique to that material, inasmuch as the physical properties of polypyrrolidone differ in many details from those of other polyamides, so that suitable procedures have to be determined anew at each stage of processing and fabrication rather than from what is described from other polyamides in the prior art.

In general it appears that so far as is known the activation of pyrrolidone-2 by the sulfonyl azetidinones is accomplished in a manner similar to the previously described methods of polymerizing pyrrolidones in the presence of the basic catalyst and an acyl-group containing activator for the polymerization. In conjunction with the sulfonyl azetidinone activators, it is necessary to employ a polymerization catalyst of the type heretofore known for the purpose. The prior art describes the types of catalysts used, and the actual, effective agent appears to be an anhydrous alkaline salt of pyrrolidone, which is present in the polymerization mixture at a concentration of about 1 to about 10 mole percent. In particular, concentrations of catalysts between about 2 and about 4 mole percent are preferred. It is particularly important for maximum results that the polymerization reaction mixture solution contain very little water, since otherwise there may be inhibition of the polymerization, resulting in reduction of yield and lower quality of polymer.

The sulfonyl azetidinone moiety seems to be the active portion of the activator compounds, and the remainder can be any of the residues of such compounds within the scope of the present invention. Apparently the sulfonyl azetidinone group reacts with the pyrrolidone, and this reaction product is the actual activator.

In order to disclose more clearly the nature of the present invention, the following examples illustrating products, compositions and processes in accordance with the invention will now be described. It should be understood, however, that this is done solely by way of example and is intended neither to delineate the scope of the invention nor to limit the ambit of the appended claims. In the examples, all parts are by weight unless otherwise specified.

PREPARATION OF THE SULFONYL ISOCYANATES

*Example 1*

About 22.9 g. (0.10 mole) of benzenesulfonylurethane and 14.2 g. (0.10 mole) of phsphoric anhydride are weighed directly into a 100 cc. flask, both materials being solids. The flask is then fitted with a one-piece Claisen head and condenser and the mixture is heated to 140° C. under reduced pressure. Bubbling is observed in the mixture and the pressure on the reaction increases from its original value of 0.5 millimeter as the temperature of the mixture is increased to 180° C. The mixture in the flask darkens and the pressure therein decreases to about 0.5 to 0.7 millimeter. 15.0 g. of colorless, liquid benzenesulfonyl isocyanate which condenses at 70° C. and 0.5 millimeter of pressure are recovered. At the end of the distillation the temperature in the reaction flask may be as high as 280° C. The structure of the product is confirmed by its infrared spectrum and its chemical reactivity. Analysis for phosphorus shows less than 0.1% present in the product. Analysis of chlorine is negative.

In three additional preparations of benzene sulfonyl isocyanate from benzenesulfonylurethane, the previously described process is repeated except that relatively smaller amounts of phosphoric anhydride are used, i.e. 10 grams, 5 grams and 0.5 gram of the phosphoric anhydride, 22.9 grams of benzenesulfonylurethane being used in each. Proportionally less of the benzenesulfonyl isocyanate product are recovered as the amount of phosphoric anhydride is decreased. Continued heating of the reaction mixture in these three preparations resulted in distillation of the starting material but no increase in the yield of the desired product.

Benzenesulfonyl isocyanate is prepared from benzenesulfonylurethane without a de-alkoxylating agent by pyrolysis as follows: 22.9 grams (0.10 mole) of benzenesulfonylurethane are heated in a 50 cc. flask mounted in an oil bath and distilled through a "Pyrex" glass pyrolysis tube, of which the exit is connected to a receiver, a liquid nitrogen trap and a vacuum pump. A 12 inch section of the pyrolysis tube is heated by an electric furnace and the pressure between the receiver and the cold trap is measured by a McLeod gauge. A total of 6 runs are made utilizing this apparatus, the pyrolysis temperature being varied from 350 to 625° C. In each case the initial pressure at the McLeod gauge is 0.1 mm. and this in most cases rose to 1.5 to 2.0 mm. during the run. In every run the pyrolysate begins to crystallize in the exit tube or the receiver soon after it began to traverse the pyrolysis tube. Conversions of 25 to 40 percent of the theoretical yield are obtained in these six runs.

About 11.5 grams (0.05 mole) of benzenesulfonylurethane and 2.0 grams of boric anhydride are weighed directly into a 100 cc. flask, both materials being solids. The flask is then fitted with a one-piece Claisen head and condenser and the mixture is heated to the range of from about 175 to 225° C. at a pressure of approximately 20 mm. 3.40 grams of crude benzenesulfonyl isocyanate which boils at 130 to 140° C. at 20 mm. pressure are recovered from the condenser. This amounts to a yield of approximately 37.0 percent of theoretical About 114.6 grams (0.50 mole) of benzenesulfonylurethane and 203 grams (1.71 moles) of thionyl chloride are refluxed together in a flask for a total of 120 hours. The excess thionyl chloride is then removed and the product is distilled under reduced pressure. Approximately 31.2 grams (34 percent of the theoretical yield) of benzenesulfonyl isocyanate are recovered. This product is found to be relatively pure, containing only 0.15 percent of chlorine.

*Example 2*

About 40.5 grams (0.164 mole) of a 4-fluorobenzenesulfonylurethane and 50 grams (.352 mole) of phosphoric anhydride are mixed in a 250 cc. flask, both materials being solids. The flask is then fitted with a one-piece Claisen head and condenser and the mixture is heated under reduced pressure. As the temperature of the mixture reaches 150° C. an evolution of gas is observed and the pressure on the reaction increases from its original value of about 0.5 mm. to approximately 1 to 2 mm. Distillation of the product released from the reaction mixture commences with a head temperature of 95° C. and continues to 110° C., the distillate (4-fluorobenzenesulfonyl isocyanate) being a liquid material which weights 22.2 grams and represents a yield of 67.5 percent of the theoretical value. Redistillation of this product produces a clear liquid which boils at 81° C. at 0.06 mm. of pressure. The structure is confirmed by the infrared spectrum of the material.

*Example 3*

About 62 grams (0.37 mole) of methanesulfonylurethane and 55 grams (0.39 mole) of phosphoric anhydride are mixed in a 500 cc. flask. The flask is then fitted with a one-piece Claisen head and condenser and the mixture is heated under reduced pressure. As the temperature of the mixture reaches 140° C. an evolution of gas is observed and the pressure on the reaction increases from its original value of about 12 mm. to approximately 15 mm. Distillation of the product released from the reaction mixture commences with a head temperature of 60° C. and continues to 65° C.; the distillate (methanesulfonyl isocyanate) is a low-melting solid material which weighs 39 grams and represents a yield of 87% of the theoretical value. Redistillation of the product produces a low-melting solid which distills at 72–77° C. at 13 mm. of pressure. The structure is confirmed by the infrared spectrum.

*Example 4*

About 20 grams (.095 mole) of 1-butanesulfonylurethane and 20 grams (.141 mole) of phosphoric anhydride are mixed in a 250 cc. flask. The flask is then fitted with a one-piece Claisen head and condenser and the mixture is heated under reduced pressure. The temperature of the mixture reaches 140° C., an evolution of gas is observed and the pressure on the reaction increases from its original value of about 10 mm. to approximately 15 mm. Distillation of the product released from the reaction mixture commences with a head temperature of 75° C. and continues to 85° C., the distillate (1-butanesulfonyl isocyanate) being a liquid material which weighs 11.8 grams and represents a yield of 76% of the theoretical value. Redistillation of this product produces a liquid which boils at 84° C. at 12 mm. of pressure. The structure is confirmed by the infrared spectrum of the material.

*Example 5*

About 20.0 grams (0.053 mole) of 1,3-benzene-bis (sulfonylurethane) and 15 grams (0.105 mole) of phosphoric anhydride are mixed in a 100 ml. flask. The flask is then fitted with a one-piece Claisen head and condenser and the mixture is heated using an oil bath under reduced pressure. When the bath temperature reaches 170° C. a reaction is initiated, as indicated by extensive streaming of gas in the system and the pressure increases from its original value of about 0.3 mm. to about 1–3 mm. As the streaming of gas diminishes the pressure again decreases to from about 0.5 to 1 mm. and liquid 1,3-benzene-bis(sulfonyl isocyanate) begins to distill. In order to prevent freezing of the distillate, no water is used in the condenser. The clear, viscous product crystallizes in the receiver within about an hour after the distillation has been completed. The crystalline 1,3-benzene-bis(sulfonyl isocyanate) melts at 70 to 73° C. Its structure is confirmed by infrared analysis.

*Analysis.*—Calculated for $C_8H_4N_2O_6S_2$: C, 33.3; H, 1.4. Found: C, 33.5; H, 1.5.

About 38.0 grams (0.10 mole) of 1,3-benzene-bis (sulfonylurethane) and 82 grams (0.69 mole) of thionyl chloride are weighed directly into a 250 ml. flask. The flask is then fitted with a condenser and the mixture is heated to reflux (79° C. at atmospheric pressure). After being maintained at reflux for approximately 4 weeks, during which time all of the solid material present has dissolved, the reaction is terminated. The excess thionyl chloride is removed by distillation and 8.3 grams (29% of the theoretical yield) of 1,3-benzene-bis(sulfonyl isocyanate) in the form of a viscous oil are collected by distillation under reduced pressure. This product which is found to react violently with water, soon crystallizes. It is shown on analysis to contain only 0.08% of chlorine thus indicating that little or no sulfonyl chloride byproduct is formed.

*Example 6*

About 38.8 grams (0.10 mole) of 1,6-bis(N-carbethoxysulfamido) hexane (prepared by the method reported in Cassady et al., Journal of Organic Chemistry, 23, 923 (1958)) and 28.4 grams (0.20 mole) of phosphoric anhydride are weighed directly into a 100 cc. flask and mixed thoroughly, both materials being solids. The flask is then fitted with a one-piece Claisen head and condenser and the mixture is heated to 140° C. under reduced pressure. Bubbling is observed in the mixture and the pressure on the reaction increases from its original value of 0.5 mm. to 2–3 mm. The mixture darkens and the pressure thereon gradually decreases to .5–1 mm. as the colorless liquid hexane-1,6-bis(sulfonyl isocyanate) distills out of the mixture at 95–110°/.5 mm. The distillate weighs 20.4 g. and represents 67% of the theoretical yield. The structure of the product is confirmed by its infrared spectrum.

PREPARATION OF THE SULFONYL AZETIDINONES

*Example 7*

About 30 parts of isobutylene and 55 parts of benzenesulfonyl isocyanate are sealed under vacuum in a glass ampoule, and heated for 16 hours at 100° C. The initial mixture is a colorless liquid which becomes amber and viscous during the reaction period. The ampoule is then chilled in a Dry Ice-acetone bath (at which time the reaction mixture becomes solid) and opened. The mixture is dissolved in about 500 parts of methanol, and the resulting solution is diluted with 400 parts of water and chilled. A crystalline precipitate forms in the solution and is collected by filtration. 43 parts of this crystalline material, 1 - benzenesulfonyl-4,4-dimethylazetidinone-2, are recovered, corresponding to a yield of 60% of theoretical. The structure of this product is

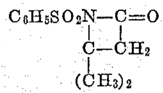

Recrystallization from a 1:1 mixture of benzene and n-hexane yields a nearly white crystalline product melting at 87.5–89.5° C.

*Analysis.*—Calculated for $C_{11}H_{13}NO_3S$: C, 55.2; H, 5.5; N, 5.85; S, 13.4; M.W. 239. Found: C, 55.0; H, 5.3; N, 5.78; S, 13.2; M.W., 241.

The infrared spectrum and nuclear magnetic resonance characteristics of this material also support the foregoing structure.

*Example 8*

About 52 parts of isobutylene, 94 parts of methanesulfonyl isocyanate and 154 parts of tetrahydrofuran (a diluent which does not react with the sulfonyl isocyanate) are sealed under vacuum in a glass ampoule, which is then heated for 20 hours at 100° C. Following this heat cycle, the ampoule is chilled in a Dry Ice-acetone bath and a precipitate of large prismatic crystals separates from the solution. The ampoule is opened and the precipitate is collected by filtration. This crystalline material melts at 120–121° C. and is identified as 1-methane-sulfonyl-4,4-dimethylazetidinone-2 which has the following structure:

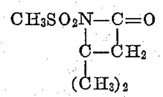

46% of the theoretical yield is recovered.

*Analysis.*—Calculated for $C_6H_{11}NO_3S$: C, 40.6; H, 6.3. Found: C, 41.0; H, 6.3.

The infrared spectrum and nuclear magnetic resonance characteristics of this material confirm the foregoing structure.

The utility of the products of this and the previous example, as well as the sulfonyl azetidinones in general, as activators for pyrrolidone-2 is demonstrated as follows:

An anhydrous mixture of pyrrolidone-2 and its potassium salt is prepared by distilling about 170 parts of xylene under reduced pressure from 50.0 parts of pyrrolidone-2, and 1.4 parts potassium hydroxide dissolved in 1.5 parts water. Six portions are placed in dry glass bottles. To five of these are added activators as follows:

Lots 1—.1 mole-percent 1-methanesulfonyl-4,4-dimethyl-azetidinone-2;
Lot 2—.5 mole-percent 1-methanesulfonyl-4,4-dimethyl-azetidinone-2;
Lot 3—1.0 mole-percent 1-methanesulfonyl-4,4-dimethyl-azetidinone-2;
Lot 4—.5 mole-percent of 1-benzenesulfonyl-4,4-dimethyl-azetidinone-2 (the product of Example 7 hereof);
Lot 5—.2 mole-percent of a known activator for pyrrolidone.

Lots 1–4 solidified to polymers within two minutes at room temperature after addition of the activator while the fifth lot required five minutes to polymerize. Completion of polymerization requires several additional hours of standing. A sixth lot containing no activator remained fluid after 24 hours.

*Example 9*

About 45 parts of benzenesulfonyl isocyanate and 43 parts of indene are sealed under vacuum in a glass ampoule and heated for 30 hours at 100° C. The initial mixture is a clear liquid which becomes amber and viscous during the reaction period. The ampoule is then chilled in a Dry Ice-acetone bath, at which time crystals form in the reaction mixture. About 200 parts of ethanol are added, the mixture is filtered and washed with another 500 parts of ethanol and dried. A yield of 16% of the theoretical amount of a light tan crystalline solid M.P. 147.5–149° C. is recovered.

Analysis.—Calculated for $C_{16}H_{13}NO_3S$: C, 64.2; H, 4.4; N, 4.67. Found: C, 63.3; H, 4.2; N, 4.42.

The product, which is also useful as an activator in the polymerization of pyrrolidone-2, is identified as the sulfonyl azetidinone having the following structure:

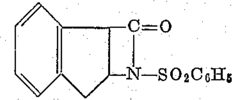

*Example 10*

About 86 parts of butanesulfonyl isocyanate dissolved in 180 parts of tetrahydrofuran and 50 parts of isobutylene are sealed under vacuum in a glass ampoule and heated for 96 hours at 100° C. The initial mixture is a clear liquid which becomes amber during the reaction period. The ampoule is then chilled in a Dry Ice-acetone bath, at which time crystals form in the reaction mixture. Ethanol (100 parts) is added and the mixture is filtered while still cold. 26 parts of a solid material melting at 39–40.5° C. are recovered, corresponding to a yield of 22% of theoretical.

*Analysis.*—Calculated $C_9H_{17}NO_3S$: C, 49.3; H, 7.8; N, 6.39. Found: C, 49.2; H, 8.1; N, 6.31.

This product is also useful as an activator in the polymerization of pyrrolidone-2.

*Example 11*

About 7 grams (.058 mole) of methanesulfonyl isocyanate and 74 grams (.064 mole) of indene are sealed under vacuum in a glass ampoule and heated for 64 hours at 100° C. The initial mixture is a clear liquid which becomes amber and viscous during the reaction period. The ampoule is then chilled in a Dry Ice-acetone bath and opened. A material is recovered which is identified as the sulfonyl azetidinone having the following structure:

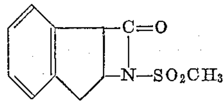

This product is also useful as an activator in the polymerization of pyrrolidone-2.

*Example 12*

About 5.2 grams (.029 mole) of benzenesulfonyl isocyanate and 4.6 grams (.044 mole) of styrene are sealed under vacuum in a glass ampoule and heated for 16 hours at 100° C. The initial mixture is a clear liquid which becomes viscous during the reaction period. The ampoule is then chilled in a Dry Ice-acetone bath and opened. The product is recovered in the usual way and shown to have the following structure:

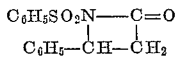

This product is also useful as an activator in the polymerization of pyrrolidone-2.

*Example 13*

Approximately equimolar portions of benzenesulfonyl isocyanate and α-methyl-styrene are sealed under vacuum in a glass ampoule and heated for 16 hours at 100° C. The initial mixture is a clear liquid which becomes amber and viscous during the reaction period. The ampoule is then chilled and opened. The mixture is an amber solid which identified as the sulfonyl azetidione which has the following structure:

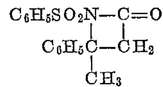

About 15.0 grams (.069 mole) of p-chlorobenzenesulfonyl isocyanate and 5.1 grams of isobutylene are sealed under vacuum in a glass ampoule and heated for 16 hours at 100° C. The initial mixture is a clear solution which becomes amber and viscous during the reaction period. The ampoule is then chilled in a Dry Ice-acetone bath, (at which time the reaction mixture becomes solid) and opened. The mixture is poured into ethanol and crystallized and then recrystallized from ethanol. The product weighing 4.2 g. (22% yield) and melting at 126–127° C. is characterized by its infrared spectrum which shows the characteristic band for the carbonyl group of an azetidinone at 5.6 microns.

*Example 15*

About 14.0 grams (.071 mole) of α-toluenesulfonyl isocyanate and 5.0 grams of isobutylene are sealed under vacuum in a glass ampoule and heated for 16 hours at 100° C. The initial mixture is a clear solution which becomes amber and viscous during the reaction period. The ampoule is then chilled in a Dry Ice-acetone bath (at which time the reaction mixture becomes solid) and opened. The mixture is dissolved in 150 parts of ethanol by warming, filtered and allowed to crystallize at room temperature. A yield of 11.6 g. (65 percent of theoretical) of a white solid melting at 86–87° C. is obtained. The material is characterized by its infrared spectrum and its elemental analyses as 1-(α-toluenesulfonyl)-4,4-dimethylazetidinone-2.

*Example 16*

About 12.5 grams (.104 mole) of methanesulfonyl isocyanate and 4.6 grams (.042 mole) of 2,5-dimethyl-1,5-hexadiene are sealed under vacuum in a glass ampoule and heated for 5 hours at 100° C. The initial mixture is a clear solution which becomes greenish-yellow and viscous during the reaction period. The ampoule is then chilled in a Dry Ice-acetone bath, at which time the reaction mixture becomes solid, and opened. The mixture is poured into 100 cc. of ethanol and the resulting solid is filtered, washed with ethanol and dried. The yield of 4.35 g. is 30 percent of theoretical of the product which may be represented by the following formula:

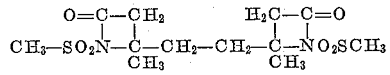

The melting point of 175–178° is improved to 178–180° by a single recrystallization from methyl ethyl ketone.

*Analysis.*—Calculated for $C_{12}H_{20}N_2O_6S_2$: C, 40.9; H, 5.7; N, 7.9. Found: C, 40.6; H, 5.8; N, 7.9.

*Example 17*

About 9.8 grams (.034 mole) of 1,3-phenylene-bis-sulfonyl isocyanate and 9.6 grams of dry tetrahydrofuran are sealed under vacuum in a glass ampoule with 5.3 g. (.094 mole) of isobutylene and heated for 16 hours at 100° C. The initial mixture is a clear solution which becomes amber and viscous during the reaction period. The ampoule is then chilled in a Dry Ice-acetone bath (at which time the reaction mixture becomes solid) and opened. The mixture is dissolved in ethanol and characterized by its infrared spectrum as phenylene-1,3-bis(1-sulfonyl-4,4-dimethylazetidinone-2).

*Example 18*

About 13 grams (.066 mole) of p-methylbenzenesulfonyl isocyanate and 6.1 grams of isobutylene are sealed under vacuum in a glass ampoule and heated for 16 hours at 100° C. The initial mixture is a clear liquid which becomes amber and viscous during the reaction period. The ampoule is then chilled in a Dry Ice-acetone bath (at which time the reaction mixture becomes solid) and opened. The mixture is dissolved in 75 cc. of 95 percent ethanol by warming, filtered while hot, and allowed to cool slowly to room temperature. A white solid is recovered weighing 8.25 g., 50 percent of theoretical, and melting at 89–90°. The structure is established by the infrared spectrum and elemental analyses as 1-(p-methylbenzensulfonyl)-4,4-dimethylazetidinone-2.

*Example 19*

About 29.6 grams (.10 mole) of 1.6-hexane-bis-sulfonyl isocyanate and 4.1 grams of 2-methyl-1-pentene are sealed under vacuum in a glass ampoule and heated for 16 hours at 100° C. The initial mixture is a clear solution which becomes amber and viscous during the reaction period. The ampoule is then chilled in a Dry Ice-acetone bath, at which time the reaction mixture becomes solid, and opened. The mixture is crystallized from chloroform-hexane and is identified by its infrared spectrum as hexane-1,6-bis(1-sulfonyl-4-n-propyl-4-methylazetidinone-2).

*Example 20*

About 18 parts of benzenesulfonyl isocyanate and 9 parts of isoprene are sealed under vacuum in a glass amopule and heated for 16 hours at 100° C. The initial mixture is a clear liquid which becomes tan and viscous during the reaction period. The ampoule is then chilled in a Dry Ice-acetone bath (at which time the reaction mixture becomes a solid) and opened. The mixture is dissolved in boiling toluene and precipitated by addition to methanol. The product is a rubbery material which is shown by infrared spectroscopy to contain sulfonyl azetidinone groups. The rubbery nature of the product suggests that some homopolymerization of the isoprene has also occurred.

The 1-benzenesulfone-4-methyl-4-vinyl azetidinone-2 formed in the reaction can be isolated by extracting the rubbery product with a suitable solvent such as ethanol.

*Example 21*

About 6.4 grams (.068 mole) of norbornene and 13.5 grams (.074 mole) of benzenesulfonyl isocyanate are sealed under vacuum in a glass ampoule and heated for 16 hours at 100° C. The initial mixture is a clear solution which becomes amber and viscous during the reaction period. The ampoule is then chilled in a Dry Ice-acetone bath (at which time the reaction mixture becomes solid) and opened. The mixture is dissolved in ethanol by warming, filtered hot and allowed to cool slowly to room temperature. A solid weighing 13.0 g., 73%, and melting at 88–90° is obtained. It is characterized by its infrared spectrum and elemental analyses as the desired sulfonyl azetidinone product.

*Example 22*

About 18.3 g. (.10 mole) of benzenesulfonyl isocyanate and 4.2 g. (.046 mole) norbornadiene are sealed under vacuum in a glass ampoule and heated for five hours at 100° C. The initial mixture is a clear solution which becomes amber and viscous during the reaction period. The ampoule is then cooled to room temperature and opened. The mixture is dissolved in ethanol, and the product is characterized by its infrared spectrum which contains a strong band at 5.60 microns (a characteristic of a carbonyl group in a four-membered ring) as the desired sulfonyl azetidinone-2 product.

The sulfonyl azetidinone-2 products of Examples 13–22 are all useful activators in the polymerization of pyrrolidone.

*Example 23*

When p-toluenesulfonylurethane, p-ethylbenzenesulfonylurethane, p-isopropylbenzenesulfonylurethane, p-phenylbenzenesulfonylurethane, m-phenylbenzenesulfonylurethane, o-phenylbenzenesulfonylurethane, propanesulfonylurethane and octanesulfonylurethane are employed in the above procedures, the corresponding sulfonyl isocyanates are formed, and are respectively p-toluenesulfonyl isocyanate, p-ethylbenzenesulfonyl isocyanate, p-isopropylbenzenesulfonyl isocyanate, p-phenylbenzenesulfonyl isocyanate, m-phenylbenzenesulfonyl isocyanate, o-phenylbenzenesulfonyl isocyanate, propanesulfonyl isocyanate and octanesulfonyl isocyanate. When p-toluenesulfonyl isocyanate is reacted with 2-methyl-2-butene, 1-p-toluenesulfonyl-3-(methyl)-4,4-(dimethyl)azetidinone-2 is formed. When p-ethylbenzenesulfonyl isocyanate is reacted with 2-pentene, p-ethylbenzenesulfonyl-3-(methyl)-4-(ethyl)azetidinone-2 is formed. When p-isopropylbenzenesulfonyl isocyanate is reacted with 2-methyl-1-pentene, 1-p-isopropylbenzenesulfonyl-4,4-(methyl,n-propyl)azetidinone-2 is formed. When p-phenylbenzenesulfonyl isocyanate is reacted with 2,4,4-trimethyl-1-pentene, 1-p-phenylbenzenesulfonyl-4,4-(methyl,neopentyl)azetidinone-2 are formed. When m-phenylbenzenesulfonyl isocyanate is reacted with 3-hexene, 1-m-phenylbenzenesulfonyl-3-(ethyl)-4-(ethyl) a azetidinone-2 is formed. When o-phenylbenzenesulfonyl isocyanate is reacted with 2-ethyl-1-hexene, 1-o-phenylbenzenesulfonyl-4,4-(ethyl,n-butyl)azetidinone-2 is formed. When propanesulfonyl isocyanate is reacted with divinyl benzene, a sulfonyl azetidinone having the following structure is formed:

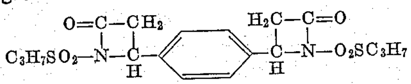

When octanesulfonyl isocyanate is reacted with α-vinylnaphthalene, 1-octanesulfonyl-4-(α-naphthyl)azetidinone-2 is formed.

Likewise, using the procedure described in Examples 1–6, but starting with α-toluenesulfonylurethane, p-methyl-α-toluenesulfonylurethane, toluene-2,4-bis(sulfonylurethane), p-xylene-α,α′-bis(sulfonylurethane), propane-1,3-bis(sulfonylurethane), pentane-1,5-bis(sulfonylurethane), benzothiazole-2-sulfonylurethane and thiophene-2-sulfonylurethane there are produced the respective isocyanates. From these isocyanates and suitable olefins, utilizing the process exemplified in Examples 7–20 hereof, other azetidinone-2 compounds can be prepared. Thus, if α-toluenesulfonyl isocyanate is reacted with butadiene, 1-α-toluenesulfonyl-4-(vinyl)azetidinone-2 is formed. If p-methyl-α-toluenesulfonyl isocyanate is reacted with 2-methyl-1-pentene-1-p-methyl-α-toluenesulfonyl-4,4-(methyl-propyl)azetidinone-2 is formed. If toluene-2,4-bis(sulfonyl isocyanate) is reacted with 3-hexene, toluene-2,4-bis[sulfonyl-3-(ethyl)-4-(ethyl)azetidinone-2] is produced. If p-xylene-α,α′-bis(sulfonyl isocyanate) is reacted with 2-ethyl-1-hexene, p-xylene α,α′-bis[sulfonyl-4,4-(ethyl,butyl)azetidinone-2] is formed. The reaction of propane-1,3-bis(sulfonyl isocyanate) with 2,5-dimethyl-1,5-hexadiene yields a polymer containing repeating units as follows:

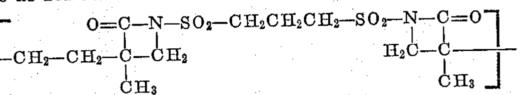

If pentane-1,5-bis(sulfonyl isocyanate) is reacted with isoprene, a polymer containing repeating units of the following formula is formed:

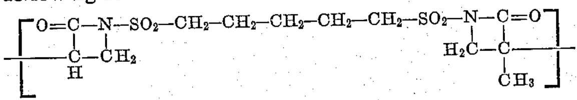

From 2 to 50 or even more such repeating units may be present in polymers of this type.

If benzothiazole-2-sulfonyl isocyanate is reacted with isobutylene, 1-(2-benzothiazolylsulfonyl)-4,4-dimethylazetidinone-2 is formed. If 1-(α-thiophenesulfonyl isocyanate) is reacted with isobutylene 1-(α-thiophenesulfonyl)-4,4-dimethylazetidinone-2 is produced. All of these azetidinones, including the polymers (insofar as they are soluble) are also useful as activators for the polymerization of pyrrolidone-2.

The terms and expressions which have been employed herein have been used as terms of description and not of limitation, and it is not intended, in the use of such terms and expressions, to exclude any equivalents of the features shown and described or portions thereof, but it is recognized that various modifications are possible within the scope of the invention claimed.

What is claimed is:

1. A sulfonyl azetidinone compound of the formula:

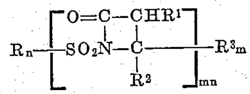

wherein R is selected from the class consisting of m-valent hydrocarbon and halogenated hydrocarbon containing up to 20 carbon atoms, phenoxyphenyl, 2-benzothiazolyl and 2-thienyl, $R^1$ is selected from the class consisting of hydrogen and lower alkyl, $R^1$ together with $R^3$ forms five and six-membered carbocyclic rings through the carbon atoms to which they are attached, $R^2$ is selected from the class consisting of hydrogen and lower alkyl, $R^3$ is selected from the class consisting of monoand divalent hydrocarbon containing up to 10 carbon atoms, the carbon-carbon single bond and hydrocarbon which joins with $R^1$ to form five and six-membered carbocyclic rings, *m* is 1 to 2, *n* is 1 when the $R^1R^3$ carbocyclic ring is formed and corresponds to the valence of $R^3$ when the $R^1R^3$ carbocyclic ring is not formed, and the sum of *m* and *n* is not more than 3.

2. A compound according to claim 1 wherein *m* is 1, *n* is 1, R is aliphatic hydrocarbon, $R^1$ is hydrogen, $R^2$ is lower alkyl and $R^3$ is monovalent hydrocarbon.

3. A compound according to claim 1 wherein *m* is 1, *n* is 1, R is cyclic hydrocarbon, $R^1$ is hydrogen, $R^2$ is hydrogen and $R^3$ is monovalent hydrocarbon.

4. A compound according to claim 1 wherein *m* is 1, *n* is 1, R is cyclic hydrocarbon, $R^1$ is hydrogen, $R^2$ is lower alkyl and $R^3$ is monovalent hydrocarbon.

5. A compound according to claim 1 wherein *m* is 1, *n* is 1, R is cyclic aliphatic hydrocarbon, $R^1$ is hydrogen, $R^2$ is lower alkyl and $R^3$ is monovalent hydrocarbon.

6. A compound according to claim 1 wherein *m* is 1, *n* is 1, R is aliphatic hydrocarbon, $R^2$ is hydrogen and $R^1$ and $R^3$ join to form a five-membered carbocyclic ring.

7. A compound according to claim 1 wherein *m* is 1, *n* is 1, R is cyclic hydrocarbon, $R^2$ is hydrogen and $R^1$ and $R^3$ join to form a six-membered carbocyclic ring.

8. A compound according to claim 1 wherein *m* is 2, *n* is 1, R is divalent aliphatic hydrocarbon, $R^1$ is hydrogen, $R^2$ is lower alkyl and $R^3$ is mono-valent hydrocarbon.

9. A compound according to claim 1 wherein *m* is 2, *n* is 1, R is divalent cyclic hydrocarbon, $R^1$ is hydrogen, $R^2$ is lower alkyl and $R^3$ is mono-valent hydrocarbon.

10. A compound according to claim 1 wherein *m* is 1, *n* is 2, R is aliphatic hydrocarbon, $R^1$ is hydrogen, $R^2$ is lower alkyl and $R^3$ is divalent hydrocarbon.

11. Phenylene-1,3-bis(1-sulfonyl-4,4-dimethyl - azetidinone-2).

12. Hexane-1,6-bis(1-sulfonyl - 4 - n-propyl-4-methyl-azetidinone-2).

References Cited by the Examiner

UNITED STATES PATENTS

| | | | |
|---|---|---|---|
| 2,171,965 | 9/39 | Weihe | 260—230 |
| 2,241,321 | 5/41 | Schlack | 260—78 |
| 2,409,712 | 10/46 | Schweitzer | 260—453 |
| 2,550,363 | 4/51 | Luten et al. | 260—239.3 |
| 2,638,463 | 5/53 | Ney et al. | 260—78 |
| 2,643,250 | 6/53 | Stallman et al. | 260—239 |
| 2,666,787 | 1/54 | Krzikalla | 260—545 |
| 2,753,319 | 7/56 | Brockway | 260—30.8 |

FOREIGN PATENTS

| | | |
|---|---|---|
| 941,847 | 4/56 | Germany. |
| 1,004,189 | 3/57 | Germany. |

OTHER REFERENCES

Degering: Organic Nitrogen Compounds, 1945, page 525.

IRVING MARCUS, *Primary Examiner.*

HAROLD N. BURSTEIN, WALTER A. MODANCE, *Examiners.*